UNITED STATES PATENT OFFICE.

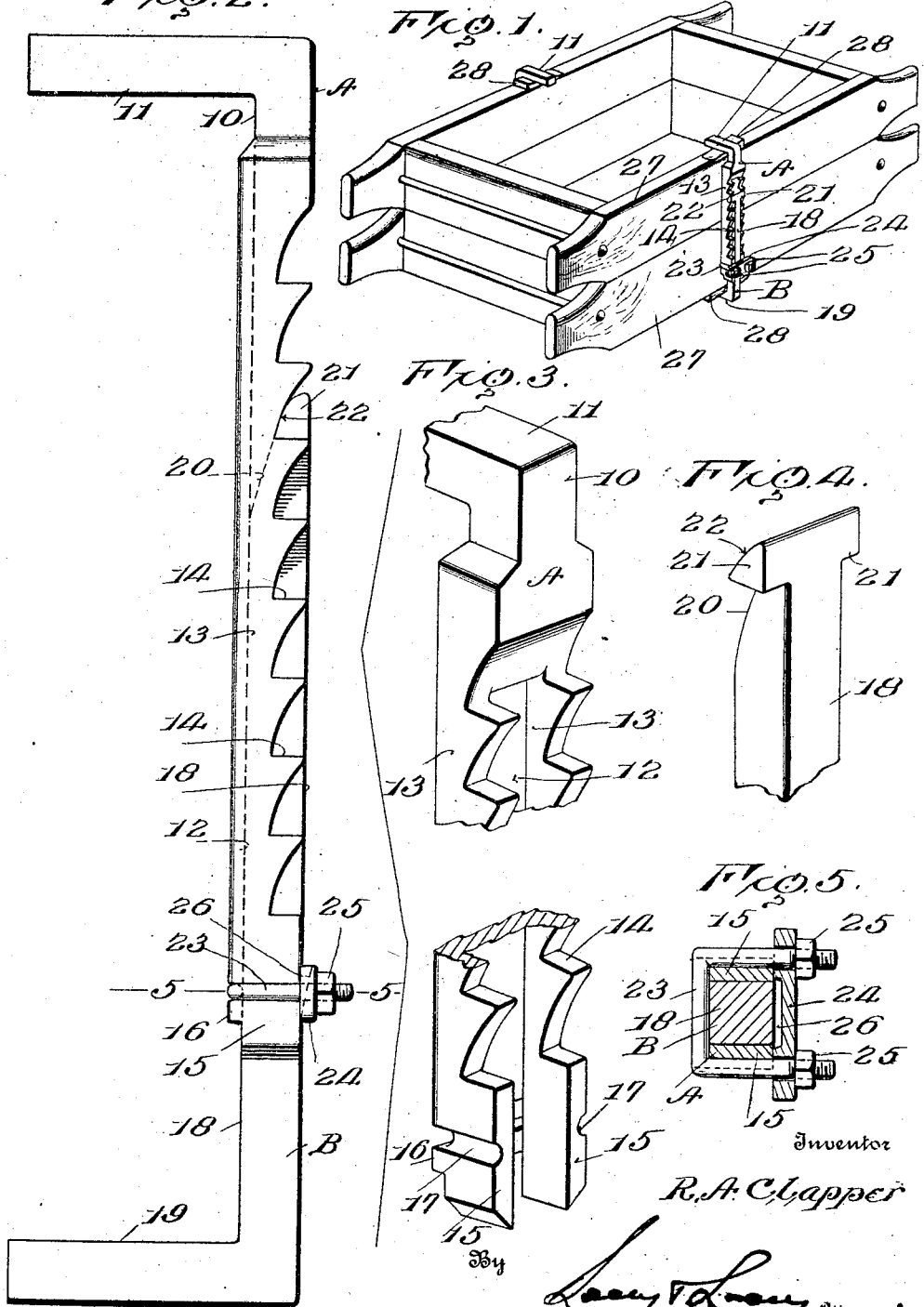

RAY A. CLAPPER, OF LIMA, OHIO.

EXTENSIBLE FLASK-CLAMP.

1,287,635.  Specification of Letters Patent.  Patented Dec. 17, 1918.

Application filed April 6, 1918. Serial No. 227,131.

*To all whom it may concern:*

Be it known that I, RAY A. CLAPPER, a citizen of the United States, residing at Lima, in the county of Allen and State of Ohio, have invented certain new and useful Improvements in Extensible Flask-Clamps, of which the following is a specification.

This invention relates to an improved extensible foundry flask clamp and has as its primary object to provide a device of this character which may be readily adjusted for clamping two or more flasks together.

The invention has as a further object to provide a clamp which will be formed of coacting sections adjustable for extending the clamp and wherein the said sections will be formed to rigidly coact with each other when adjusted for securely holding the flasks together.

And the invention has as a still further object to provide an arrangement wherein the sections of the clamp will be held against separation.

Other and incidental objects will appear as the description proceeds. In the drawings wherein I have illustrated the preferred embodiment of the invention, and wherein similar reference characters designate corresponding parts through the several views:

Figure 1 is a perspective view showing the manner in which my improved clamp is employed for connecting a pair of flasks, the flasks being conventionally shown, Fig. 2 is a side elevation on an enlarged scale particularly illustrating the manner in which the shanks of the sections of the clamp are received one within the other, Fig. 3 is a fragmentary perspective view showing the channeled shank of one of the clamp sections, Fig. 4 is a fragmentary perspective view showing the lug carried by the shank of the other clamp section to coact with the teeth formed on the flanges of the clamp section shown in Fig. 3, and Fig. 5 is a transverse sectional view taken on the line 5—5 of Fig. 2, and illustrating the manner in which the sections of the clamp are locked at adjustment.

In carrying out the invention my improved clamp is formed of complemental sections A and B respectively. The section A is constructed with a shank 10 carrying at one end a lateral clamping arm 11 and formed throughout the major portion of its length to provide a channel 12 having parallel lateral flanges 13. Formed in the outer edges of these flanges are oppositely disposed series of longitudinally spaced teeth 14 having outwardly curved longitudinal edges. At the outer open end of the channel, the flanges 13 project longitudinally beyond the bottom wall thereof to form spaced guide flanges 15 projecting beyond the mouth of the channel and connecting these flanges is a web 16 extending between the bottom edges of the flanges in spaced parallel relation to the adjacent end edge of the bottom wall of the channel. Formed in the outer side faces of the flanges in a plane between the web 16 and the said edge of the channel bottom wall are oppositely disposed grooves 17 extending transversely of the flanges. The section B of the clamp is formed with a shank 18 carrying at its outer end a lateral clamping arm 19 to confront the clamping arm 11 of the section A. The shank 18 is adapted to slidably fit within the channel 12 of the section A to lie flush with the outer edges of the flanges 13 of the said channel and is preferably formed with a beveled inner end 20 sloping toward the adjacent terminal of the shank. Formed on the inner end of the shank, at opposite sides thereof, are oppositely disposed lugs 21 adapted to engage within the series of notches 14 of the flanges 13 of the channel 12 and provided with curved inner faces 22 to fit, as particularly shown in Fig. 2 of the drawings, the curved longitudinal walls of the said notches. Thus it will be seen that these lugs will coact with the said teeth for rigidly connecting the sections of the clamp. However, by simply pushing inwardly upon the clamp sections the faces 22 of the said lugs will coact with the curved edges of the notches engaged by the lugs for lifting the inner end of the shank 18 out of the channel 12 and riding the lugs out of engagement with the said notches. Thus, the sections of the clamp may be readily adjusted upon each other, and, of course, the lugs 15 at the open end of the channel will direct the shank 18 of the section B within the channel when the inner end of said shank is lifted by the lugs 21 riding over the teeth 14 of the channel flanges.

Loosely connecting the sections is a U-bolt 23 fitting between the web 16 of the flanges 15 and the adjacent outer edge of the bottom wall of the channel 12 to extend within the grooves 17 in the said flanges.

Loosely fitting over the ends of the said bolt is a clip 24 which thus overlies the shank 18 and is clamped in position by thumb nuts 25 adjustable upon the bolt. Formed in the lower face of the clip to open through the lower edge thereof, is a transversely inclined recess 26 adapted to receive the shank 18. The lugs 15 at the clip 24 are slightly wider than the flanges 13 of the channel 12 so that the shank 18 may slide beneath the clip. Therefore, the shank 18 will, when the inner end thereof is lifted by the lugs 21 riding upon the teeth 14, be permitted to pivot upon the connecting web 16 up into this recess so that the lugs 21 may clear the said teeth. Thus the sections may be readily adjusted upon each other in the manner previously described without removing the U-bolt 23 and clip 24.

In Fig. 1 of the drawings I have shown the use of a pair of my improved clamps in connection with a pair of conventional flasks 27, these flasks being placed one upon the other in the usual manner. The sections of the clamps are first adjusted upon each other as previously described, to receive the sides of the flasks between the clamping arms thereof, when suitable wedges 28 are driven between the said arms and the flasks for thus binding the flasks together. Preferably, the wedges used in connection with each of the clamps are, as shown in this figure, reversely presented, so that the operation of driving the wedges beneath the clamping arms of the clamps will not act to dislocate the clamps. As will be seen, the clamps will thus rigidly connect the flasks. In any instance where a greater number of flasks are to be connected in the manner suggested in Fig. 1, the clamps may simply be extended for engaging around the said flasks and, of course, a similar adjustment of the clamps may be had for connecting flasks of various depths. I therefore provide a particularly simple and efficient construction for the purpose set forth and a clamp adapted to dispense with the use of different sized flask clamps as now commonly employed.

Having thus described the invention, what is claimed as new is:

1. An extensible clamp including coacting clamp sections each having a shank provided one with a channel adjustably receiving the shank of the other section, a U-bolt embracing the channel of the first shank, a clip carried by said U-bolt to overlie the second shank for slidably connecting said shanks and provided with a recess adapted to receive the second shank whereby the second shank may rock upon the first shank, the said shanks being freely movable inwardly toward each other, and coacting means carried by the shanks for adjustably holding the shanks against outward movement.

2. An extensible clamp including coacting clamp sections each having a shank provided one with a channel adjustably receiving the shank of the other section, a U-bolt embracing the channel of the first shank, a clip carried by said U-bolt to overlie the second shank for slidably connecting said shanks, and coacting means carried by the shanks for adjustably holding the shanks against outward movement.

3. An extensible clamp including coacting clamp sections each having a shank provided one with a channel adjustably receiving the shank of the other section, guide flanges carried by the said channel at the mouth thereof and slidably receiving the said second mentioned shank, a web connecting said flanges and disposed in spaced relation to the outer end of the bottom wall of the channel, means embracing the said flanges and loosely connecting the shanks, the said means fitting between the said web and the said channel wall, and coacting means carried by the shanks for adjustably holding the shanks against outward movement.

4. An extensible clamp including coacting clamp sections each having a shank provided one with a channel adjustably receiving the shank of the other section, guide flanges projecting longitudinally from the side walls of the channel at the mouth thereof and slidably receiving the said second mentioned shank, means embracing said flanges and extending around said second mentioned shank for loosely connecting the said shanks, the said means coacting with the flanges to be held against movement longitudinally thereof, and coacting means carried by the shanks for adjustably holding the shanks against outward movement.

In testimony whereof I affix my signature.

RAY A. CLAPPER. [L. S.]

Copies of this patent may be obtained for five cents each, by addressing the "Commissioner of Patents, Washington, D. C."